J. WHELAN.
APPARATUS FOR PRESERVING CORPSES AND OTHER ORGANIC MATTER FROM DECOMPOSITION.

No. 171,332. Patented Dec. 21, 1875.

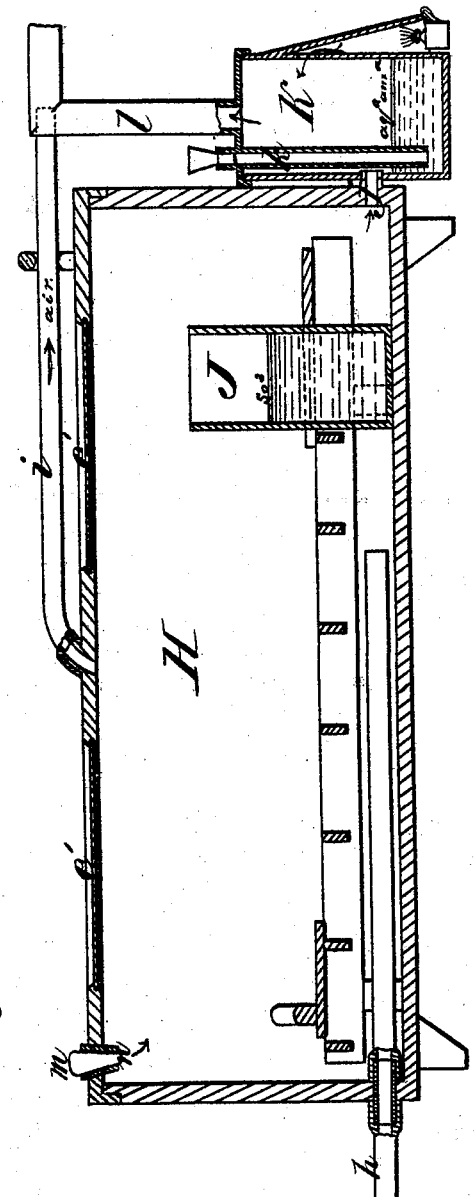
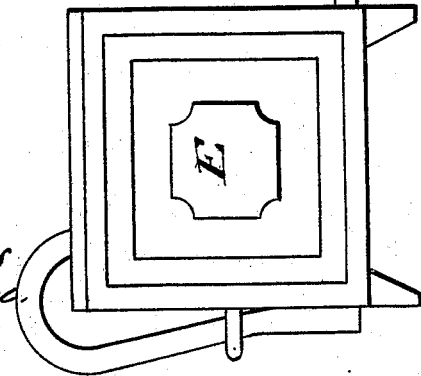

3 Sheets—Sheet 3.

J. WHELAN.
APPARATUS FOR PRESERVING CORPSES AND OTHER ORGANIC MATTER FROM DECOMPOSITION.

No. 171,332.                                         Patented Dec. 21, 1875.

WITNESSES
INVENTOR
ATTORNEYS

UNITED STATES PATENT OFFICE.

JAMES WHELAN, OF ZANESVILLE, OHIO.

IMPROVEMENT IN APPARATUS FOR PRESERVING CORPSES AND OTHER ORGANIC MATTER FROM DECOMPOSITION.

Specification forming part of Letters Patent No. 171,332, dated December 21, 1875; application filed June 5, 1875.

*To all whom it may concern:*

Be it known that I, JAMES WHELAN, of Zanesville, in the county of Muskingum and State of Ohio, have invented a new and valuable Improvement in Preserving Organic Matter from Putrefaction and Decomposition; and I do hereby declare that the following is a full, clear, and exact description of the construction and operation of the same, reference being had to the annexed drawings, making a part of this specification, and to the letters and figures of reference marked thereon.

Figure 1:
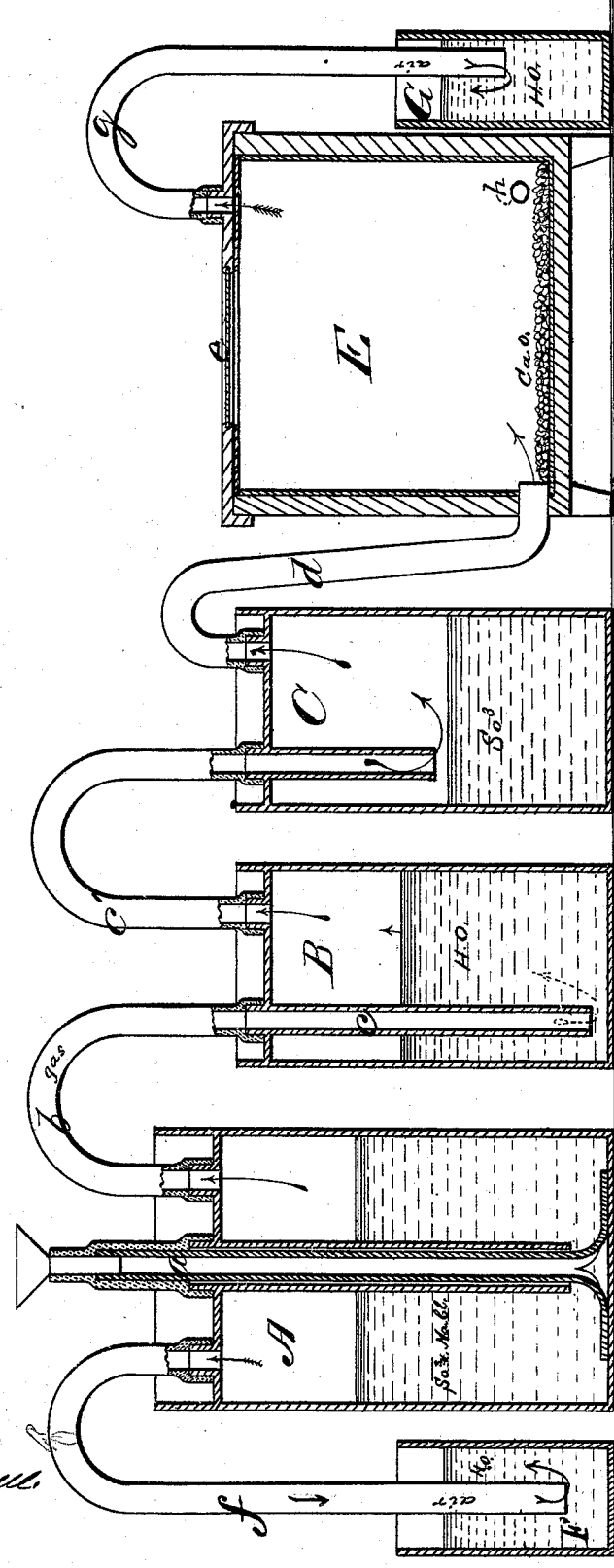
Figure 3:
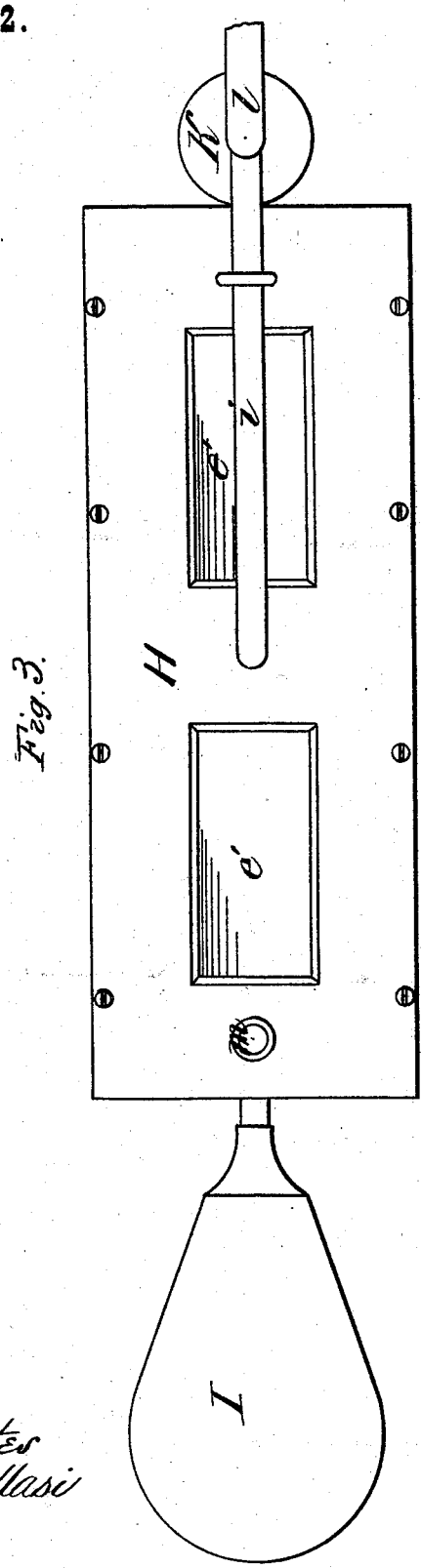

Figure 1 of the drawings is a representation of a longitudinal vertical section of my machine, and Fig. 2 is a transverse vertical sectional view of the same. Fig. 3 is a detail view.

This invention has relation to improvements in the means of preserving organic remains, such as the human cadaver, or specimens in natural history, from putrefactive decomposition; and the nature of the invention consists in actinizing chlorine gas in a gas-holder or casket having a glass lid, or glass-covered openings, in combination with an apparatus for manufacturing chlorine, connected with said receptacle and apparatus for carrying off the gases attached to the latter, as will be hereinafter more fully set forth.

In the annexed drawings, A designates a retort, which is provided with a funnel-shaped tube, $a$, through which sulphuric acid is poured upon common salt in the inside of the said retort. Chlorine thus generated passes through a tube, $b$, into a second vessel, B, and it is passed through water and purified by means of a tube, $c$, extending downward below the level of a sufficient quantity of water in the said vessel, with which tube $b$ is directly connected by means of a suitable coupling. Vessel B communicates by means of a tube, $c'$, with a third vessel, C, and the gas in the former vessel passes over a suitable quantity of good commercial sulphuric acid in the bottom of the latter, and then escapes through the medium of a tube, $d$, into a suitable gas-holder, which is properly lined to hold the gas. Gas-holder E contains a suitable quantity of white quick-lime, which, from its affinity for water, will effectually keep the gas in the holder dry, and it is provided with a glass lid, $e$, through which the actinic rays of light will have access to the gas for the purpose of reducing it to an allotropic state. The small vessel F to the left of retort A is a stoneware or other vessel containing water, and it communicates with the said retort by means of a tube, $f$, which passes into the water below its surface. By this means the gas will be prevented from escaping from the retort, but the air which will be driven out of it by natural displacement will in no way be impeded. It is well known that water at 60° Fahrenheit will absorb twice its volume of chlorine gas; consequently when the first indications of gas present themselves it will be a sufficient warning that the said retort no longer contains air, and that it is time to disconnect vessel F and retort A, either by means of a clamp or stopcock. The gas passing through vessels B C and gas-holder E, through the medium of pipes $b\ c\ d$, will expel the air from gas-holder E by natural displacement, driving it out into the open air through a pipe, $g$, the lower end of which is buried in water contained in a vessel, G, arranged at one side of gas-holder E. The gas being prepared and held ready for use, the subject to be operated on will be placed in the embalming-case, having glass-covered openings $e'$ in its lid, and designated by the letter H in the drawings, and the gas-holder and casket connected by means of a flexible tube, $h$, when the gas will pass into the case in consequence of its gravity. I may, however, if I so elect, hasten its passage thereinto by means of a bellows, having a valve opening outwardly in its nozzle to prevent the escape of gas by reverse action. The air that may thus be introduced into the casket will rise to the top and escape through a tube, $i$, the gas, from its greater specific gravity, remaining near its bottom. Within the casket is placed a small vessel, J, containing a quantity of sulphuric acid, which will absorb all the moisture arising from the subject which may not have escaped with sufficient rapidity through the aforesaid tube. By this means the interior of the casket will be kept entirely dry. K represents an exhausting-cylinder, which communicates by means of a tube, $j$, with the interior of the casket, and which is designed to be closed during the operation. When the subject has been under the influence of actinized gas for about four hours, this tube will be opened and a sufficient quantity of aqua ammonia poured into the cylinder K, care being taken not to cover the orifice of tube $j$, through a funnel, $k$. The lid of cylinder K is provided with a double-elbowed pipe, $l$, one arm of which is connected with tube $i$, before mentioned, the other being passed into a chimney-flue, out of a window, or other aperture, in order that bystanders may not be incommoded by the odor of the gas. A stopper, $m$, is then taken out of a vent-hole, $n$, in the head of the casket, and a communication established between the lower portion of the casket and the said cylinder by opening tube $j$, when the gas will rapidly escape through pipes $i$ $l$ into the open air and the casket be freed from gas through the volatilization of the ammonia in cylinder K.

The operation of saturating the subject with actinized chlorine gas may be performed in an ordinary burial-casket having a glass lid. It may also be conducted at night, but the gas should in this case have been previously actinised, as without an intense artificial light, not always obtainable, it would remain in a passive state and electro-positive condition. Chlorine, as is well known, possesses powerful disinfecting qualities. It will replace hydrogen, but will not combine with it in the dark, so that in order to produce the desired result of preserving bodies from putrefactive decomposition the chlorine gas must be made to undergo "allotropism," and enter into an active state and electro-negative condition. This change is produced by the actinic rays of light.

In practice the gas may be generated, purified, and anhydrated, as above described, and passed into a gum-elastic bag or gas-holder, I, which, being connected with a casket, will allow its contents to pass therein, a gentle pressure upon the said bag greatly facilitating and accelerating its entrance. In this case the actinism must take place during the operation, and not previously, as when the rigid gas-holder is used.

By subjecting a cadaver to the treatment above described, it may be kept in perfect condition for any length of time, and under any climate, even when decomposition is already far advanced.

The value of the process to undertakers and anatomical schools will be incalculable, both in regard to the comfort of dissecting an always inodorous subject, and to its comparative economy.

In cold weather the escape of gas from the casket may be accelerated by the use of a spirit-lamp applied to the ammonia-vessel, the heat of which will cause the ammonia therein to volatilize more rapidly, and to combine more readily with the hydrochloric acid.

I am well aware that it is not new to use chlorine gas in the actinized state; and that the use of chlorine as a disinfectant to break up the hydrogen compounds, which are the products of putrefactive decomposition is common; hence, I do not claim any invention therein.

What I claim as new, and desire to secure by Letters Patent, is—

A gas-receptacle for the preservation of organic substances, provided with a glass-covered opening, in combination with an apparatus for manufacturing chlorine connected with said receptacle, and an apparatus for carrying off the gases attached to the latter, substantially as described, and for the purpose set forth.

In testimony that I claim the above I have hereunto subscribed my name in the presence of two witnesses.

JAMES WHELAN.

Witnesses:
E. H. BATES,
GEORGE E. UPHAM.